(12) United States Patent
Gupta et al.

(10) Patent No.: US 10,073,882 B1
(45) Date of Patent: Sep. 11, 2018

(54) SEMANTICALLY EQUIVALENT QUERY TEMPLATES

(71) Applicant: Google Inc., Mountain View, CA (US)

(72) Inventors: Nitin Gupta, Santa Clara, CA (US); Mangesh Gupte, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 1216 days.

(21) Appl. No.: 13/941,586

(22) Filed: Jul. 15, 2013

(51) Int. Cl.
  *G06F 17/30* (2006.01)

(52) U.S. Cl.
  CPC .............................. *G06F 17/30424* (2013.01)

(58) Field of Classification Search
  CPC .................................................. G06F 17/30424
  See application file for complete search history.

(56) References Cited

U.S. PATENT DOCUMENTS

| | | | |
|---|---|---|---|
| 6,178,416 B1 | 1/2001 | Thompson et al. | |
| 7,492,949 B1* | 2/2009 | Jamieson | G06F 17/248 382/217 |
| 8,145,623 B1* | 3/2012 | Mehta | G06F 17/3064 707/713 |
| 8,234,265 B1* | 7/2012 | Yagnik | G06Q 30/02 707/708 |
| 8,321,846 B2 | 11/2012 | Chatterjee | |
| 8,346,792 B1 | 1/2013 | Baker et al. | |
| 8,392,445 B1 | 3/2013 | Das et al. | |
| 8,577,913 B1* | 11/2013 | Hansson | G06F 17/30 707/767 |
| 8,886,575 B1* | 11/2014 | Liu | G06Q 30/0201 706/12 |
| 8,949,242 B1* | 2/2015 | Lin | G06F 17/30731 707/739 |
| 2001/0003183 A1* | 6/2001 | Thompson | G06F 17/30395 |
| 2003/0069880 A1* | 4/2003 | Harrison | G06F 17/30663 |
| 2004/0158455 A1* | 8/2004 | Spivack | G06F 17/30731 704/9 |
| 2004/0193582 A1* | 9/2004 | Smyth | G06F 17/30533 |
| 2004/0220893 A1* | 11/2004 | Spivack | G06F 9/4443 706/46 |

(Continued)

FOREIGN PATENT DOCUMENTS

CN    102360346 B  *  5/2014

*Primary Examiner* — Mark D Featherstone
*Assistant Examiner* — Navneet K Gmahl
(74) *Attorney, Agent, or Firm* — Middleton Reutlinger

(57) ABSTRACT

Methods and apparatus for determining whether query templates that have the same entity collection identifier are semantically equivalent query templates based on determining a similarity measure between the query templates. The similarity measure may be based on various factors. For example, in some implementations the similarity measure may be based on a number of the entities of the entity collection that instantiate both of the query templates in a record of past user queries. Also, for example, in some implementations the similarity measure may be based on a number of the entities of the entity collection that instantiate both of the query templates in a record of past user queries and are determined to be entities that satisfy a threshold level of entity similarity between the query templates. In some implementations, terms of two query templates that are determined to be equivalent may be determined to be synonymous.

15 Claims, 5 Drawing Sheets

(56) References Cited

U.S. PATENT DOCUMENTS

| | | | |
|---|---|---|---|
| 2007/0055656 A1* | 3/2007 | Tunstall-Pedoe | G06F 17/30654 |
| 2009/0019020 A1 | 1/2009 | Dhillon et al. | |
| 2009/0216730 A1* | 8/2009 | Sastry | G06F 17/30398 |
| 2010/0114944 A1* | 5/2010 | Adler | G10L 13/027 707/770 |
| 2010/0325133 A1* | 12/2010 | Rounthwaite | G06F 17/30864 707/759 |
| 2011/0213761 A1* | 9/2011 | Song | G06F 17/30867 707/706 |
| 2012/0265787 A1* | 10/2012 | Hsu | G06F 17/3064 707/780 |
| 2013/0046771 A1* | 2/2013 | Moitra | G06F 17/30705 707/749 |
| 2013/0073490 A1* | 3/2013 | Baughman | G06N 3/126 706/13 |
| 2013/0091165 A1* | 4/2013 | Han | G06F 17/30693 707/769 |
| 2014/0279995 A1* | 9/2014 | Wang | G06F 17/30864 707/706 |
| 2014/0330866 A1* | 11/2014 | Hess | G06F 17/30864 707/771 |

\* cited by examiner

| Template | Entity | Instantiations of the Template for the Entity | Total Document Selections for the Instantiations | Search Result Documents and Document Selections | Document Selection Rates | |
|---|---|---|---|---|---|---|
| $T_1$ | $E_1$ | $Q_1$ | 23,722 | $D_1$ = 9,700<br>$D_2$ = 9,200<br>$D_3$ = 3,500<br>$D_4$ = 350 | $D_1$ = 0.4089<br>$D_2$ = 0.3878<br>$D_3$ = 0.1475<br>$D_4$ = 0.0147 | A<br><br>B |
| $T_2$ | $E_1$ | $Q_2$ | 15,521 | $D_1$ = 7,600<br>$D_2$ = 5,250<br>$D_3$ = 2,750<br>$D_4$ = 450 | $D_1$ = 0.4896<br>$D_2$ = 0.3382<br>$D_3$ = 0.1772<br>$D_4$ = 0.0289 | C |
| 1 | 2 | 3 | 4 | 5 | 6 | |

FIG. 2

| DSR ($T_x$, $E_1$, $D_x$) | HMTSR ($T_x$, $E_1$, $D_x$) | DSR ($T_x$, $E_1$, $D_x$) * HMTSR ($T_x$, $E_1$, $D_x$) | ES($D_x$) | ES ($E_1$) | A |
|---|---|---|---|---|---|
| DSR ($T_1$, $E_1$, $D_1$) = 0.4089 | HMTSR ($T_1$, $E_1$, $D_1$) = 0.5929 | 0.2424 | ES ($D_1$)= 0.2424 | 0.3062 | B |
| DSR ($T_2$, $E_1$, $D_1$) = 0.4896 | HMTSR ($T_2$, $E_1$, $D_1$) = 0.5516 | 0.2701 | | | C |
| DSR ($T_1$, $E_1$, $D_2$) = 0.5878 | HMTSR ($T_1$, $E_1$, $D_2$) = 0.4123 | 0.2429 | ES ($D_2$)= 0.1874 | | D |
| DSR ($T_2$, $E_1$, $D_2$) = 0.3382 | HMTSR ($T_2$, $E_1$, $D_2$) = 0.5542 | 0.1874 | | | E |
| 1 | 2 | 3 | 4 | 5 | |

FIG. 3

SEMANTICALLY EQUIVALENT QUERY TEMPLATES

BACKGROUND

This specification is directed generally to determining whether query templates are semantically equivalent query templates.

Different search queries are often issued by users that are seeking the same type of information. For example, a first user may issue a first query and navigate to a first search result document for the query in seeking certain information. A second user may issue a unique second query and navigate to the same search result document in seeking the same information.

SUMMARY

The present disclosure is directed to methods and apparatus for determining whether query templates are semantically equivalent query templates. A query template, as used herein, includes one or more terms and an identifier of an entity collection. An entity collection is a grouping of entities that share one or more aspects in common. For example, the query template [life expectancy in <Country>] includes the terms "life", "expectancy", and "in" and the identifier "Country" that identifies an entity collection of Countries. Techniques discussed herein may utilize instantiations of the query template in determining whether query templates are semantically equivalent. Generally speaking, an instantiation of the query template includes one or more terms of the query template and an alias of an entity of the entity collection of the query template. For example, instantiations of the query template [life expectancy in <Country>] include [life expectancy in india] and [life expectancy in United States], with "india" being an alias of an entity that belongs to the collection "Country" and "united states" likewise being an alias of an entity that belongs to the entity collection "Country".

Whether two query templates that have the same entity collection identifier are determined to be equivalent query templates may be based on determining a similarity measure between the query templates. For example, whether the query template [life expectancy in <Country>] is equivalent to the query template [average life span in <Country>] may be based on a similarity measure between the query templates. Various factors on which the similarity measure may be based are discussed herein and one or more of such factors may be utilized in determining the similarity measure. For example, in some implementations the similarity measure may be based on a number of the entities of the entity collection that instantiate both of the query templates in a record of past user queries. Also, for example, in some implementations the similarity measure may be based on a number of the entities of the entity collection that instantiate both of the query templates in a record of past user queries and are determined to be entities that satisfy a threshold level of entity similarity between the query templates. In some implementations, terms of two query templates that are determined to be equivalent may be determined to be synonymous. For example, if the query template [life expectancy in <Country>] is determined to be equivalent to the query template [average life span in <Country>], the phrases "life expectancy" and "average life span" may be determined to be equivalent.

In some implementations a computer implemented method may be provided that includes the steps of: determining a first query template, the first query template including one or more first template terms and an identifier of an entity collection, and the entity collection being a grouping of entities that share one or more aspects in common; determining a second query template, the second query template including one or more second template terms and the identifier of the entity collection, and the second template terms including at least one term that is unique from the first template terms; identifying a given entity of the entity collection; determining first query template instantiations for the given entity, each first query template instantiation including the first template terms and one of one or more aliases of the entity; determining second query template instantiations, each second query template instantiation including the second template terms and one of the one or more aliases of the entity; determining a search result document that is responsive to one or more of the first query template instantiations and responsive to one or more of the second query template instantiations; determining a first document selection rate of the search result document for the first query template instantiations; determining a second document selection rate of the search result document for the second query template instantiations; determining a similarity measure between the first query template and the second query template, the similarity measure based on the first document selection rate and the second document selection rate; and determining whether the first and second query templates are equivalent query templates based on the similarity measure.

This method and other implementations of technology disclosed herein may each optionally include one or more of the following features.

In some implementations the method may further comprise determining, for the given entity: one or more first term selection rates for the search result document, each first term selection rate being for one first template term of one or more of the first template terms for the search result document; and one or more second term selection rates for the search result document, each second term selection rate being for one second template term of one or more of the second template terms for the search result document. The determination of the similarity measure between the first query template and the second query template may be further based on the first query template term selection rate and the second query template term selection rate. In some implementations each first term selection rate may be based on a selection rate of the search result document among a first query set that includes only queries that include the given entity and the first template term; and each second term selection rate may be based on a selection rate of the search result document among a second query set that includes only queries that include the given entity and the second template term. In some implementations the method may further comprise: determining a first harmonic mean of the first query template term selection rates; and determining a second harmonic mean of the second query template term selection rates. The determination of the similarity measure between the first query template and the second query template may be further based on the first harmonic mean and the second harmonic mean. In some implementations the determination of the similarity measure between the first query template and the second query template may be further based on multiplying the first selection rate by the first harmonic mean and multiplying the second selection rate by the second harmonic mean, and determining a minimum value of the multiplications.

The method may further comprise determining that the first selection rate and the second selection rate satisfy a selection rate threshold.

The method may further comprise determining that the search result document lacks description of multiple attributes of the entity collection and only utilizing the search result document if it lacks description of multiple attributes. In some implementations determining that the search result document lacks description of multiple attributes of the entity collection may include determining that a selection rate threshold for the search result document is only satisfied by queries that contain a single attribute of the entity collection.

The first query template instantiations and the second query template instantiations may be determined from a record of past queries. In some implementations the record of past queries may include only those queries submitted with at least a threshold level of frequency.

The method may further comprise: determining additional entities of the entity collection; determining, for each additional entity of the additional entities: additional first instantiations for the additional entity based on the first query template, additional second instantiations for the additional entity based on the second query template, an additional search result document that may be responsive to one or more of the additional first query template instantiations and responsive to one or more of the additional second query template instantiations, an additional first document selection rate of the search result document for the additional first query template instantiations, an additional second document selection rate of the search result document for the additional second query template instantiations, and determining an additional entity similarity measure based on the additional first document selection rate and the additional second document selection rate. In some implementations the determination as to whether the first and second query templates are equivalent query templates may be based on an entity similarity measure satisfaction number based on the quantity of the entity similarity measure and the additional entity similarity measures that may satisfy a threshold. In some implementations the determination as to whether the first and second query templates are equivalent query templates may be further based on a total entity number based on the quantity of the given entity and the additional entities.

In some implementations the method may further comprise determining that the first template terms and the second template terms are synonymous based on determining that the first and second query templates are equivalent query templates.

In some implementations a computer implemented method may be provided that includes the steps of: determining a first query template, the first query template including one or more first template terms and an identifier of an entity collection, the entity collection being a grouping of entities that share one or more aspects in common; determining a second query template, the second query template including one or more second template terms and the identifier of the entity collection, the second template terms including at least one term that is unique from the first template terms; identifying entities of the entity collection; determining entity groups of instantiations of the first query template and the second query template, each entity group including first query template instantiations of past queries for a given entity of the entities and second query template instantiations of the past queries for the given entity, each first query template instantiation of the entity group including the first template terms and one or multiple aliases of the given entity and each second query template of the entity group including the second template terms and one or multiple aliases of the given entity; determining, for each entity group, an entity similarity measure for the given entity of the entity group; and determining whether the first and second query templates are equivalent query templates based on the entity similarity measures for multiple of the entity groups.

This method and other implementations of technology disclosed herein may each optionally include one or more of the following features.

The entity similarity measure for the entity group may be based on: document selection rates of one or more search result documents responsive to the first query template instantiations and the second query template instantiations of the entity groups, the document selection rates being for the first query template instantiations of the entity group and the second query template instantiations of the entity group; and term selection rates of the one or more search result documents, the term selection rates being for the first terms of the first query template instantiations of the entity group and the second terms of the second query template instantiations of the entity. In some implementations determining whether the first and second query templates are equivalent query templates may be based on the quantity of the entity similarity measures for the multiple of the entity groups that satisfy a similarity measure threshold. In some implementations determining whether the first and second query templates are equivalent query templates may be based on the quantity of the entity similarity measures for the multiple of the entity groups that satisfy a similarity measure threshold and the total number of entities of the entity collection.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein identify a pair of query templates and determine a similarity measure for the pair of query templates. The determined similarity measure represents a new aspect of the pair of query templates and may be utilized to determine if the query templates are semantically equivalent query templates.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 2 is an example table utilized in describing examples of determining document selection rates for query templates.

FIG. 3 is an example table utilized in describing examples of determining an entity similarity measure between query templates.

DETAILED DESCRIPTION

Figure 1:
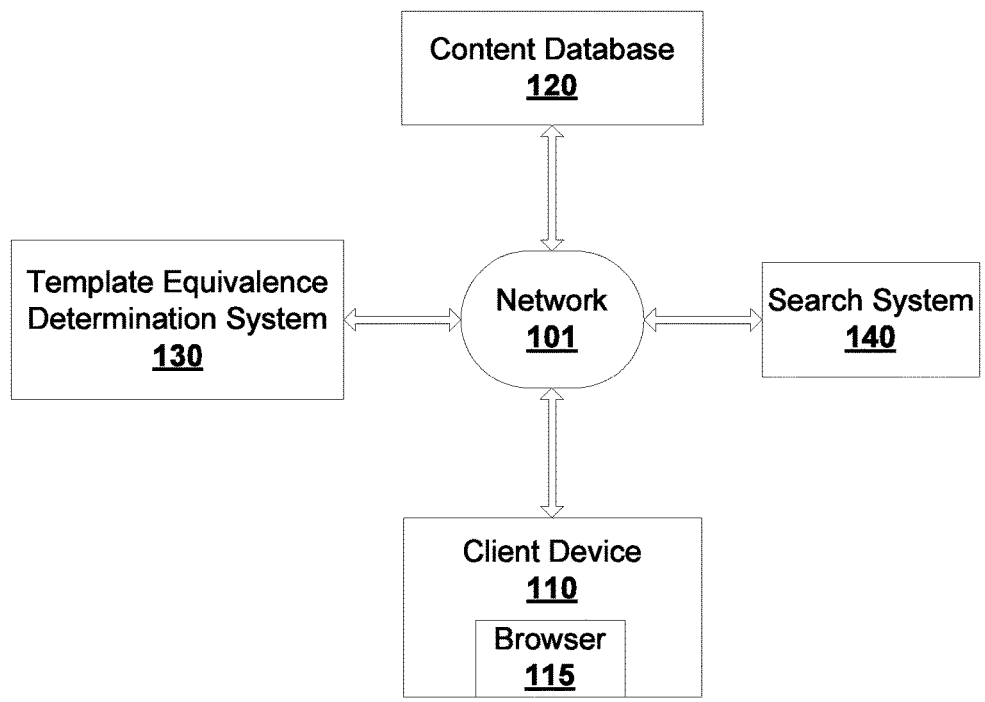
FIG. 1 is a block diagram of an example environment in which it may be determined whether query templates are equivalent.

Technology described herein is useful in determining whether query templates are semantically equivalent. As discussed, a query template, as used herein, includes one or more terms and an identifier of an entity collection. For example, the query template [attractions in <City>] includes the terms "attractions in" and the identifier "City" that identifies an entity collection of cities. Techniques discussed herein may utilize instantiations of the query template for multiple entities of the entity collection in determining whether query templates are semantically equivalent. For example, instantiations of the query template [attractions in <City>] include [attractions in san francisco], [attractions in sfo], and [attractions in new orleans], with "san francisco" and "sfo" being aliases of an entity that belongs to the collection "City" and "new orleans" likewise being an alias of an entity that belongs to the entity collection "City".

Whether two query templates that have the same entity collection identifier are determined to be equivalent query templates may be based on determining a similarity measure between the query templates. For example, whether the query template [attractions in <City>] is equivalent to the query template [places to visit in <City>] may be based on a similarity measure between the query templates. Various factors on which the similarity measure may be based are described herein and one or more of such factors may be utilized in determining the similarity measure. For example, in some implementations the similarity measure may be based on entities from the entity collection of the query templates that instantiate both of the templates in a record of past user queries. For example, assuming 1,000,000 entities are present in the entity collection "City", if 500,000 of those entities instantiated both of the query templates in a record of past user queries, it may be more indicative of similarity between the two query templates than if only 1,000 of those entities instantiated both of the query templates in a record of past user queries.

Also, for example, in some implementations the similarity measure may be based on a number of the entities of the entity collection that instantiate both of the query templates in a record of past user queries and are determined to be entities that have a threshold level of entity similarity between the query templates. For example, entity similarity between the query templates for a given entity may be based on, for a given search result document responsive to entity instantiations of both of the query templates, one or more of selection rates for the entity instantiations of the query templates for the given search result document, term selection rates for terms of the query templates for the given search result document, and/or a determination that the search result document is not a document that describes multiple attributes of the entity collection of the query templates. Attributes of an entity collection are one or more aspects of the entity collection that may each be utilized to define an aspect of entities of the entity collection. For example, attributes of the entity collection "City" may include, "Area", "Population", and "Unemployment Rate".

Equivalence of query templates may be utilized, in some implementations, to determine synonymous terms. For example, if the first query template [attractions in <City>] and the second query template [places to visit in <City>] are determined to be equivalent, one or more terms of the first query and the second query may be determined to be synonymous. For example, "attractions" and "places" may be determined to be synonymous and/or "attractions in" and "places to visit in" may be determined to be synonymous.

FIG. 1 illustrates a block diagram of an example environment 100 in which equivalent query templates may be identified. The example environment 100 includes a communication network 101 that facilitates communication between the various components in the environment. In some implementations the communication network 101 may include the Internet, one or more intranets, and/or one or more bus subsystems. The communication network 101 may optionally utilize one or more standard communications technologies, protocols, and/or inter-process communication techniques. The example environment 100 also includes a client device 110, a content database 120, a template equivalence determination system 130, and a search system 140.

The client device 110 may execute one or more applications, such as a web browser 115. The client device 110 may be, for example, a desktop computing device, a laptop computing device, a tablet computing device, a mobile phone computing device, a tablet computing device, a computing device of a vehicle of the user (e.g., an in-vehicle communications system, an in-vehicle entertainment system, an in-vehicle navigation system), a wearable apparatus of the user that includes a computing device (e.g., a watch of the user having a computing device, glasses of the user having a computing device). Additional and/or alternative computing devices may be provided.

In some implementations the template equivalence determination system 130 determines a query template pair to determine if the query template pair is equivalent. Each query template of the query template pair includes one or more terms and an identifier of an entity collection. For example, a first query template [attractions in <City>] may be determined and a second query template [places to visit in <City>] may be determined. In some implementations the query templates may be identified based on a record of queries such as a record of past queries in content database 120. Past queries may include queries issued via one or more computing devices of users such as client device 110. For example, a query template may be determined if a threshold number of past queries conform to the query template and/or if a threshold number of past queries that conform to the query template have been submitted with at least a threshold level of frequency. Also, for example, a query template may be generated from a past query by replacing an entity in the past query with an identifier for the entity collection of that entity. For example, the query [life expectancy in india] includes the entity associated with the country "India", and this entity belongs to the entity collection for "Country". Accordingly, the query template [life expectancy in <Country>] may be generated from the query [life expectancy in india] by replacing the entity associated with the country "India" with an identifier for an entity collection of that entity, "Country". As another example, the query [places to visit in sfo] includes the entity associated with the city "San Francisco", and this entity belongs to the entity collection for "City" and belongs to the entity collection "California City". Accordingly, the query template [places to visit in <City>] may be generated from the query [places to visit in sfo] by replacing the entity associated with the city "sfo" with an identifier for the entity collection of that entity, "City"; and/or the query template [places to visit in <California City>] may be generated from the query [places to visit in sfo] by replacing the entity associated with the city "sfo" with an identifier for an entity collection of that entity, "Category City". In some implementations the query templates may be identified from a database such as content database 120 that includes a collection of query templates. For example, [attractions in <City>] and [places to visit in <City>] may be query templates that may be stored in content database 120.

In some implementations content database 120 and/or other database may store information related to different entity collections. The information related to different entity collections may be utilized, for example, to enable determination of the query templates and/or to determine one or more factors for a similarity measure. The information related to different entity collections may include, for example, a list of entity collections such as "Country", "City", "Rivers", "Dish", "Food", and so forth. The information related to different entity collections may also include information related to the set of entities that may be included in each entity collection. For example, the entity collection "Country" may be mapped to entities associated with countries such as the countries of "US", "Australia", "India". As another example, the entity collection "City" may be mapped to entities associated with cities such as "San Francisco", "Las Vegas", and "Seattle". Also, for example, the entity collection "River" may be mapped to entities associated with rivers such as the "Mississippi", "Amazon", and "Ganges" rivers. The information related to different entity collections may also include, for example, metadata associated with the entity collections and/or attributes of the entity collections.

In some implementations query templates may be determined based on search results and/or search result documents related to the query templates. For example, a given search result document may be responsive to queries conforming to one or more query templates, and for such queries, the given search result document may have a selection rate that satisfies a threshold. As referred to herein, a "selection" of a virtual object, a search result, and/or an online resource may include, for example a mouse-click, a click-through, a voice-based selection, a selection by a user's finger on a presence-sensitive input mechanism (e.g., a touch-screen device), and/or any other appropriate selection mechanism. For example, a selection rate of a search result document for a search query may be based on the number of selections of a search result for that search result document that is provided in response to the search query. As another example of determining query templates based on search results and/or search result documents related to the query templates, the given search result document may be responsive to queries conforming to one or more query templates, and for such queries, the given search result document may be among the X highest ranked search results, wherein X is representative of an integer. Also, for example, in some implementations a given search result document associated with a search result having the highest selection rate for a given query conforming to a query template having an entity of an entity collection may be identified. The query template to which the given query conforms may be determined to be a first query template of the query template pair. Additional queries that include an entity from the entity collection and to which the search result document is responsive may also be identified. One or more of such additional queries may be utilized to determine the second query template of the query template pair.

In some implementations a database such as the content database 120 may only include past queries having submission rates above a certain threshold. In some implementations the content database 120 may only include past queries that satisfy a time threshold. For example, any past queries that are more than a year old may not be stored in the content database 120. Additional restrictions may optionally apply to any stored data such as the exclusion of certain queries such as queries not issued by more than a threshold number of users. The content database 120 may be collectively stored in one or more storage mediums. In this specification, the term "database" will be used broadly to refer to any collection of data. The data of the database does not need to be structured in any particular way, or structured at all, and it can be stored on storage devices in one or more geographic locations. Thus, for example, the content database 120 may include multiple collections of data, each of which may be organized and accessed differently.

In some implementations a query template may be identified based on a query submitted by a user and/or one or more other actions of the user. For example, the user may issue a search query via client device 110. In some implementations the search system 140 may receive the search query and the template equivalence determination system 130 may determine a query template based on the search query. For example, the user may submit a search query [weather in Florida]. The search system 140 may receive the search query and the template equivalence determination system 130 may determine a query template of [weather in <State>] based on the search query.

Additional and/or alternative methods may be utilized in determining a query template such as methods based on identification and/or analysis of similar queries. For example, in some implementations the template equivalence determination system 130 may utilize keyword matching, phrase matching, and/or contextual similarity matching of phrases in determining query templates. Also, for example, soft matching and/or exact matching of terms and/or phrases may be utilized. In some implementations soft matching between terms and/or phrases may be based on determining an edit distance between the terms and/or phrases and comparing that to a threshold. In some implementations soft matching between terms and/or phrases may be based on comparing canonicalized versions of terms and/or phrases. For example, terms and/or phrases could be stemmed and their stop words removed, before matching. Stop words include words that are common and may include articles such as "a", "an," "and," and "the"; prepositions such as "of," "to" and "for"; auxiliary verbs such as "have" and "were"; and/or typical initial words in questions such as "who", "how" and "where".

In some implementations users may interact with the search system 140 through one or more client devices 110 and/or the template equivalence identification system 130 may interact with the search system 140. The search system 140 may include memory for storage of data and software applications, a processor for accessing data and executing applications, and components that facilitate communication over the communication network 101. The client devices 110 may execute applications, such as web browsers (e.g., web browser 115 executing on client device 110), that allow users to formulate queries and submit them to the search system 140. The search system 140 may receive queries from one or more client devices 110 and/or the template equivalence identification system 130 and may execute the queries against a database of available documents such as web pages, images, text documents, and multimedia content. The search system 140 may identify search result documents which match a submitted query, and may respond by generating search results that identify the search result documents. For example, in response to a query issued by the client device 110 the search system 140 may provide search results to the client device 110 in a form that can be presented to a user via the client device. For example, in response to a query from the client device 110, the search system 140 may provide a search results web page to be displayed in the web browser 115 executing on the client device 110.

In some implementations, the template equivalence identification system 130 may identify, for each query template, one or more entities of the entity collection of the query template. In some implementations, entities may be persons, places, concepts, and/or things that may be referred to by a text fragment (e.g., a term or phrase) and are distinguishable from one another (e.g., based on context). For example, [attractions in <City>] is a query template that includes an entity collection "City" that includes multiple entities associated with cities, such as the cities of "San Francisco", "Las Vegas", Hong Kong", and so forth. As another example, [life expectancy in <Country>] is a query template that includes an entity collection "Country" that includes multiple entities associated with countries, such as the countries "US", "India", "Australia", and so forth.

For a given query template, the template equivalence identification system 130 may determine instantiations of the query template. Each instantiation of the query template includes the non-entity collection terms of the query template and an alias of an entity that belongs to the entity collection of the query template. For example, instantiations of the query template [attractions in <City>] may include [attractions in san Francisco] and [attractions in LA]. In some implementations template equivalence identification system 130 may determine instantiations of the query template for a given entity of the entity collection by determining the entity is part of the entity collection of the query template, determining aliases of the entity, and generating each instantiation by including an alias of the entity with the non-entity collection terms of the query template. For example, for the query template [attractions in <City>], the entity associated with the city of "Los Angeles" in California may be determined, and aliases of the entity may determined such as "Los Angeles", "LA", and "City of Angels". Instantiations of the query template for the entity associated with the city of "Los Angeles" in California may be generated such as [attractions in Los Angeles], [attractions in LA], and [attractions in City of Angels].

In some implementations only those instantiations that are included in past queries and/or are associated with a threshold submission frequency of past queries may be generated and/or utilized. For example, the query [attractions in City of Angels] may not be present in the past queries and/or may not represent a sufficient number of past queries and may not be generated and/or utilized.

As discussed herein, in some implementations, for each query, a database such as content database 120 may include data related to the query such as a query submission rate indicative of a number of times and/or the frequency with which the query has been submitted, identifiers of one or more search result documents responsive to the query, and/or selection rates for one or more search result documents responsive to the query. For example, content database 120 may include data indicating that during a specified time interval, the query [attractions in san francisco] was issued 9,435 times, and the query [attractions in sfo] was issued 28,231 times. As another example, content database 120 may include data indicating that during a specified time interval, the query [life expectancy in US] was issued 5,203 times, and the query [life expectancy in Australia] was issued 522 times. As another example, content database 120 may include data indicating the selection rate for one or more search result documents responsive to the query [attractions in sfo]. For example, a first search result document may have a selection rate of 0.2, indicating approximately 20% of the users submitting the query [attractions in sfo] selected a search result corresponding to the first search result document in response to the query.

The template equivalence determination system 130 determines a similarity measure between two query templates and utilizes the similarity measure to determine if the two query templates are semantically equivalent. For example, if a determined similarity measure between two query templates satisfies a threshold similarity measure, the two query templates may be determined to be semantically equivalent. In some implementations the similarity measure may be based at least in part on entities from the entity collection of the query templates that instantiate both of the query templates in a record of past user queries. For example, assuming 1,000,000 entities are present in the entity collection "City", if 500,000 of those entities instantiated both of the query templates in a record of past user queries, it may be more indicative of similarity between the two query templates than if only 1,000 of those entities instantiated both of the query templates in a record of past user queries.

As an example, let $T_1$ and $T_2$ be two query templates, with each including one or more terms and an identifier of an entity collection $EC_1$. The entity collection $EC_1$ has five entities that are members of that collection, $E_1$, $E_2$, $E_3$, $E_4$, and $E_5$. A record of past queries submitted by users may be utilized to determine that for template $T_1$, queries are present that are instantiations of the template and that collectively include aliases of entities $E_1$, $E_2$, $E_3$, $E_4$, and $E_5$ in the place of the entity collection identifier. For example, query list $Q_{11}$ may include one or more queries instantiating the template $T_1$, wherein each of those queries include an alias of entity $E_1$ in place of the entity collection identifier. Likewise, each of query lists $Q_{12}$, $Q_{13}$, $Q_{14}$, and $Q_{15}$ may include one or more queries instantiating the template $T_1$, wherein each of the queries of the respective query lists include an alias of a respective one of entities $E_2$, $E_3$, $E_4$, and $E_5$ in place of the entity collection identifier. A record of past queries submitted by users may also be utilized to determine that for template $T_2$, queries are present that are instantiations of the template and that collectively include aliases of entities $E_1$, $E_2$, and $E_3$ (but not $E_4$ and $E_5$) in the place of the entity collection identifier. For example, query list $Q_{21}$ may include one or more queries instantiating the template $T_2$, wherein each of those queries include an alias of entity $E_1$ in place of the entity collection identifier. Likewise, each of query lists $Q_2$ and $Q_3$ may include one or more queries instantiating the template $T_2$, wherein each of the queries of the respective query lists include an alias of a respective one of entities $E_2$ and $E_3$ in place of the entity collection identifier. Thus, three entities ($E_1$, $E_2$, and $E_3$) out of the five entities from the entity collection $EC_1$ of the query templates $T_1$ and $T_2$ instantiate both of the query templates in a record of past user queries.

The number of entities from the entity collection of the query templates that instantiate both of the query templates in a record of past user queries may be utilized in determining the similarity measure. For example, as the number and/or percentage of entities from the entity collection of the query templates that instantiate both of the query templates in a record of past user queries increases, the similarity measure will become more indicative of similarity. For example, if five out of the five entities from the entity collection $EC_1$ of the query templates $T_1$ and $T_2$ instantiate both of the query templates in a record of past user queries, the similarity measure may be more indicative of similarity than if only three of the five entities instantiated both of the query templates.

In some implementations the similarity measure may additionally and/or alternatively be based on a number of the entities of the entity collection that are determined to be entities that satisfy a threshold level of entity similarity between the query templates. For example, of those entities that instantiate both of the query templates in a record of past user queries, it may be determined how many of such entities are determined to be entities that satisfy a threshold level of entity similarity between the query templates. For example, as the number and/or percentage of entities from the entity collection of the query templates that instantiate both of the query templates in a record of past user queries and satisfy a threshold level of similarity between the query templates increases, the similarity measure will become more indicative of similarity.

An entity similarity measure between the query templates for a given entity may be based on, for one or more given search result documents responsive to entity instantiations of the query templates, one or more of selection rates for the entity instantiations of the query templates for the given search result documents, term selection rates for terms of the query templates for the given search result documents, and/or a determination that the given search result documents are not documents that describe multiple attributes of the entity collection of the query templates.

Referring to FIG. 2, an example table is illustrated that will be utilized to describe examples of determining document selection rates for query templates. In FIG. 2, the rows are labeled by letters A through C and the columns are labeled by numbers 1 through 6. A position XY will refer to the entry in row X and column Y. For example, position A1 includes the term "Template". A pair of query templates $T_1$ and $T_2$ is illustrated in column 1, the entity utilized to form an entity group of instantiations for each of the query templates $T_1$ and $T_2$ is illustrated in column 2, and the instantiations of the templates $T_1$ and $T_2$ for the entity are shown in column 3. For example, query template $T_1$ is illustrated at position B1. Entity $E_1$ is illustrated at position B2 and may be utilized to determine instantiations $Q_1$ of the query template $T_1$. The instantiations $Q_1$ may include one or more queries that each include terms of the query template $T_1$ and an alias of the entity $E_1$ in place of the entity collection identifier of the query template $T_1$. The instantiations $Q_1$ may be determined, for example, utilizing one or more techniques described herein such as utilizing past queries optionally satisfying one or more parameters and/or past queries optionally conforming to the query template and/or variants of the query template. As one example, the query template $T_1$ may be [attractions in <City>], $E_1$ may be the entity associated with the city "San Francisco" and the instantiations $Q_1$ may include queries such as $q_{11}$=[attractions in San Francisco] and $q_{12}$=[attractions in sfo] that are instantiations of the query template [attractions in <City>] for the entity associated with the city "San Francisco".

The total number of document selections for the instantiations of column 3 is identified in column 4. For example, the total number of document selections for all the queries in instantiations $Q_1$ is 23,722 selections as illustrated at position B4. For example, the total number of document selections for the queries $q_{11}$=[attractions in San Francisco] and $q_{12}$=[attractions in sfo] may be identified as 23,722 selections. Generally speaking, the total number of document selections for a search query is indicative of the total number of selections by users of any search results returned for the search query. In some implementations the total number of document selections for a search query may be based on the total number of submissions of the search query. In some implementations the total number of document selections and the total number of submissions for a search query may differ (e.g., certain submissions may not lead to any selection). The entity equivalence determination system 130 may determine the total number of document selections of column 3 utilizing data from some or more databases such as content database 120.

Column 5 identifies search result documents $D_1$, $D_2$, $D_3$, and $D_4$ that are responsive to one or more of instantiations $Q_1$ and to one or more of instantiations $Q_2$. Column 5 further identifies the number of selections for each search result document for the respective instantiations $Q_1$ and $Q_2$. For instantiations $Q_1$ document $D_1$ has 9,700 selections, document $D_2$ has 9,200 selections, document $D_3$ has 3,500 selections, and document $D_4$ has 350 selections. For instantiations $Q_2$ document $D_1$ has 7,600 selections, document $D_2$ has 5,250 selections, document $D_3$ has 2,150 selections, and document $D_4$ has 450 selections.

The entity equivalence determination system 130 may determine the search result documents that are responsive to one or more of instantiations $Q_1$ and to one or more of instantiations $Q_2$ utilizing, for example, one or more databases and/or the search system 140. For example, searches may be issued via the search system 140 for queries of instantiations $Q_1$ and $Q_2$ and search results utilized to determine those search result documents that are common between one or more of instantiations $Q_1$ and one or more of instantiations $Q_2$. Also, for example, for each of the queries of instantiations $Q_1$ and $Q_2$ a database may contain an identifier of one or more search result documents responsive to the query. For example, for each query the database may include identifiers of search result documents that have been selected by at least a threshold number of users for that query and include a number of selections for each of the search result documents. The number of selections for each query may be utilized to determine the number of selections for each search result document for the respective instantiations $Q_1$ and $Q_2$. For example, instantiations $Q_1$ may include queries $q_{11}$ and $q_{12}$. Query $q_{11}$ may have 4,500 selections for document $D_1$ and query $q_{12}$ may have 5,200 selections for document $D_1$. Thus, the total number of selections for instantiations $Q_1$ may be 9,700 (4,500+5,200).

In some implementations entity equivalence determination system 130 may determine a search result document is responsive to instantiations $Q_1$ and to instantiations $Q_2$ if the search result document is responsive to any one of the instantiations $Q_1$ and is also responsive to any one of the instantiations $Q_2$. In some implementations entity equivalence determination system 130 may only determine a search result document is responsive to instantiations $Q_1$ and to instantiations $Q_2$ if the search result document is responsive to at least a threshold number of the instantiations of $Q_1$ and is also responsive to at least a threshold percentage of the instantiations $Q_2$. In some versions of those embodiments the threshold percentage may be one-hundred percent.

Column 6 illustrates the document selection rate for each search result document for the respective instantiations $Q_1$ and $Q_2$. In some implementations the document selection rate for a search result document for entity instantiations of a template may be based on the ratio of the number of selections of the search result document for the instantiations to the total number of selections for the instantiations. For example, as illustrated at position B6, the document selection rate for document $D_1$ for instantiations $Q_1$ may be determined as 0.4089, based on the ratio of 9,700 (at position B5) to 23,722 (at position B4). As another example, as illustrated at position C6, the document selection rate for document $D_1$ for instantiations $Q_2$ may be determined as 0.4896, based on the ratio of 7,600 (at position F5) to 15,521 (at position F4).

Although selection rates for a search result document for entity instantiations of a template are discussed with respect to FIG. 2 as being determined based on a ratio of a number of selections of the search result document for the instantiations to the total number of selections for the instantiations, other techniques may be utilized. For example, instead of determining a number of selections of the search result document for each of the queries of instantiations $Q_1$, the selection rate of the search result document for each of the queries of instantiations $Q_1$ may be determined. The selection rates of the search result document for each of the queries of instantiations $Q_1$ may be utilized to determine the document selection rate for the instantiation $Q_1$. For example, a sum of the selection rates of the search result document for each of the queries of instantiations $Q_1$ may be utilized. For example, instantiations $Q_1$ may include queries $q_{11}$ and $q_{12}$. Query $q_{11}$ may have a selection rate of 0.1897 for document $D_1$ and query $q_{12}$ may have a selection rate of 0.2192 for document $D_1$. Thus, the document selection rate for document $D_1$ for instantiations $Q_1$ may be 0.4089 (0.1897+0.2192).

As discussed herein, the document selection rate for a given entity may be utilized to determine an entity similarity measure for that entity for a pair of query templates. For example, one or more document selection rates for query templates $T_1$ and $T_2$ for entity $E_1$ may be utilized to determine an entity similarity measure between query templates $T_1$ and $T_2$ for entity $E_1$. Such entity similarity measure may be utilized to determine a similarity measure for the query templates $T_1$ and $T_2$. For example, in some implementations, an entity similarity measure for query templates $T_1$ and $T_2$ for entity $E_1$ may be based on one or more of the document selection rates for documents $D_1$, $D_2$, $D_3$, and $D_4$ that satisfy a threshold for both of query templates $T_1$ and $T_2$. In some implementations the threshold may be a fixed threshold. In some implementations the threshold may be based on one or more factors such as the query template, the entity, the type of document, the total number of selections, and so forth. For example, in some implementations it is determined, for each document, whether the document selection rate for that document for both templates $T_1$ and $T_2$ satisfies a threshold. If it is determined that the document selection rate for that document for both templates $T_1$ and $T_2$ satisfies a threshold, then one or more of the document selection rates may be utilized in determining the entity similarity measure, such as the minimum document selection rate between the two selection rates.

As an example, a threshold of 0.15 may be identified that must be exceeded to be satisfied. The document selection rates of documents $D_1$ and $D_2$ (0.4089, 0.3878) of query template $T_1$ may be determined to satisfy the threshold, while the document selection rates of documents $D_3$ and $D_4$ (0.1475, 0.0147) of query template $T_1$ may be determined to not satisfy the threshold. Likewise, document selection rates of documents $D_1$, $D_2$, and $D_3$ (0.4896, 0.3382, 0.1772) of query template $T_2$ may be determined to satisfy the threshold, while the document selection rates of document $D_4$ (0.1275) of query template $T_2$ may be determined to not satisfy the threshold. Only the document selection rates of documents $D_1$ and $D_2$ satisfy the threshold for both query templates $T_1$ and $T_2$. In some implementations those document selection rates of documents $D_1$ and $D_2$ may be utilized in determining an entity similarity measure between the query templates $T_1$ and $T_2$ for entity $E_1$. For example, a normed distance of the document selection rates may be determined and utilized to determine an entity similarity measure. The entity similarity measure may be compared to an entity level similarity measure threshold to determine if the similarity measure indicates the query templates $T_1$ and $T_2$ are equivalent for the entity $E_1$.

Although FIG. 2 only illustrates an example of determining document selection rates for a single entity $E_1$ for the entity class of templates $T_1$ and $T_2$, document selection rates may also be determined for additional entities of the entity class in a similar manner. Such document selection rates may be utilized to determine if query templates $T_1$ and $T_2$ are equivalent for an associated entity. For example, for an additional entity $E_2$, instantiations of the templates $T_1$ and $T_2$ may be determined, and total document selections for each of the instantiations of each of the templates $T_1$ and $T_2$ may be determined. Moreover, search result documents that are responsive to one or more of instantiations of $T_1$ utilizing entity $E_2$ and responsive to one or more of instantiations of $T_2$ utilizing entity $E_2$ may be determined (which may differ from the search result documents related to entity $E_1$) and the number of selections for each search result document for the respective instantiations may be determined. Based on such information document selection rates may be determined for entity $E_2$ for the templates $T_1$ and $T_2$. In some implementations those document selection rates may be utilized in determining an entity similarity measure between the query templates $T_1$ and $T_2$ for entity $E_2$.

In some implementations one or more term selection rates may additionally and/or alternatively be determined for each of templates $T_1$ and $T_2$ for each of search result documents $D_1$, $D_2$, $D_3$, and $D_4$ that are responsive to one or more of instantiations $Q_1$ and to one or more of instantiations $Q_2$. Generally, a term selection rate for a given search result document for a given term of a template looks to a collection of queries that are mapped to the document and determines a selection rate of queries of that collection that include the given term. For example, with continuing reference to FIG. 2, for document $D_1$ a collection of queries that are mapped to the document may be determined from one or more databases such as content database 120. In some implementations the collection of queries includes all queries that are mapped to the document. In some implementations the collection of queries includes a subset of all queries that are mapped to the document, such as those queries that include an alias of entity $E_1$. In some implementations the collection of queries may include those queries of instantiation $Q_1$ and/or $Q_2$ and additional queries.

A term selection rate for document $D_1$ may be determined for each of one or more terms of template $T_1$. In some implementations a term may include multiple words. For example, in some implementations "cell phone" may be a single term. In some implementations a term selection rate may not be determined for one or more terms of template $T_1$ such as stop words. The term selection rate for document $D_1$ for a given term of template $T_1$ may be based on the number of selections of the document among those queries of the collection of queries that include the given term as compared to the number of selections for the document among all queries of the collection. For example, assume template $T_1$ is [places to visit in <city>] and entity $E_1$ is the entity associated with the city of San Francisco. The collection of queries may include all past queries that include an alias of entity $E_1$ and are mapped to the document $D_1$. The number of selections for document $D_1$ among all queries of the collection may be 10,000. For the term "places" of template $T_1$, those queries of the collection that include the term "places" may be determined and it may be determined that the number of selections among such queries for document $D_1$ is 1,100. The term selection rate for the term "places" may be based on a comparison of 1,100 to 10,000. For example, the term selection rate for the term "places" may be determined based on dividing the number of selections for document $D_1$ among queries that include the term "places" by the number of selections for document $D_1$ among all queries of the collection. Thus, the term selection rate for "places" may be determined to be 0.11 (1,100/10,000). Similarly, for the term "visit" of template $T_1$, those queries of the collection that include the term "visit" may be determined and it may be determined that the number of selections among such queries for document $D_1$ is 1,500. The term selection rate for the term "visit" may be based on a comparison of 1,500 to 10,000. For example, the term selection rate for the term "places" may be determined to be 0.15 (1,500/10,000). In some implementations term selection rates may not be determined for the terms "to" and "in" of template $T_1$.

In some implementations an overall term selection rate for document $D_1$ for entity $E_1$ for query template $T_1$ may also be determined based on the individual term selection rates. For example, in some implementations the overall term selection rate may be based on an average, a cosine similarity measure, and/or other statistical measure of the individual term selection rates. In some implementations the overall term selection rate for document $D_1$ for entity $E_1$ for query template $T_1$ may be based on the harmonic mean of the individual term selection rates. For example, the overall term selection rate may be determined based on the following equation:

$$\text{Overall Term Selection Rate} = \frac{n}{\sum_{k=1}^{n} \frac{1}{\text{Term Selection Rate}_k}},$$

where n is the total number of determined individual term selection rates and Term Selection Rate$_k$ is the $k^{th}$ determined term selection rate for the query template. In some implementations a harmonic mean value may indicate that all the terms have a high term selection rate for the given search result document D for the given entity. For example, if the term selection rate for even one Term Selection Rate$_k$ is determined to be a low value, then its reciprocal, $$\frac{1}{\text{Term Selection Rate}_k},$$

may be determined to be a larger value, and this may contribute more to the sum in the denominator for the harmonic mean. Accordingly, the value of the harmonic mean will become correspondingly smaller. Likewise, a higher value for the harmonic mean is indicative of a lower value for the sum in the denominator. Accordingly, the contribution of each summand $$\frac{1}{\text{Term Selection Rate}_k}$$

has to be correspondingly low, which may in turn imply that the term selection fraction for each term Term Selection Rate$_k$ is correspondingly high.

The term selection rate for document $D_1$ for a given term of template $T_2$ may likewise be determined. For example, assume template $T_2$ is [attractions in <city>] and entity $E_1$ is the entity associated with the city of San Francisco. The collection of queries may include all past queries that include an alias of entity $E_1$ and are mapped to the document $D_1$. The number of selections for document $D_1$ among all queries of the collection may be 10,000. For the term "attractions" of template $T_2$, those queries of the collection that include the term "attractions" may be determined and it may be determined that the number of selections among such queries for document $D_1$ is 1,900. The term selection rate for the term "attractions" may be based on a comparison of 1,900 to 10,000. For example, the term selection rate for the term "attractions" may be determined to be 0.19 (1,900/10,000).

Term selection rates may likewise be determined for each of templates $T_1$ and $T_2$ for each of search result documents $D_2$, $D_3$, and $D_4$ that are responsive to one or more of instantiations $Q_1$ and to one or more of instantiations $Q_2$.

As discussed herein, the term selection rates for a given entity may be utilized to determine an entity similarity measure for that entity for a pair of query templates. For example, one or more overall term selection rates for query templates $T_1$ and $T_2$ for entity $E_1$ may be utilized to determine an entity similarity measure between query templates $T_1$ and $T_2$ for entity $E_1$. Such entity similarity measure may be utilized to determine a similarity measure for the query templates $T_1$ and $T_2$. For example, in some implementations, an entity similarity measure for query templates $T_1$ and $T_2$ for entity $E_1$ may be based on one or more of the term selection rates for documents $D_1$, $D_2$, $D_3$, and $D_4$ that satisfy a threshold for both of query templates $T_1$ and $T_2$. In some implementations the threshold may be a fixed threshold. In some implementations the threshold may be based on one or more factors such as the query template, the entity, the type of document, the total number of selections, and so forth. For example, in some implementations it is determined, for each search result document, whether the term selection rate for that search result document for both templates $T_1$ and $T_2$ satisfies a threshold. If it is determined that the term selection rate for that document for both templates $T_1$ and $T_2$ satisfies a threshold, then one or more of the term selection rates may be utilized in determining the entity similarity measure, such as the minimum selection rate between the two selection rates.

As an example, a threshold of 0.15 may be identified that must be exceeded to be satisfied. The term selection rates of documents $D_1$ and $D_2$ of query template $T_1$ may be determined to satisfy the threshold, while the term selection rates of documents $D_3$ and $D_4$ of query template $T_1$ may be determined to not satisfy the threshold. Likewise, term selection rates of documents $D_1$, $D_2$, and $D_3$ of query template $T_2$ may be determined to satisfy the threshold, while the term selection rates of document $D_4$ of query template $T_2$ may be determined to not satisfy the threshold. Only the term selection rates of documents $D_1$ and $D_2$ satisfy the threshold for both query templates $T_1$ and $T_2$. In some implementations those term selection rates of documents $D_1$ and $D_2$ may be utilized in determining an entity similarity measure between the query templates $T_1$ and $T_2$ for entity $E_1$. For example, a normed distance$^2$ of the term selection rates may be determined and utilized to determine an entity similarity measure. The entity similarity measure may be compared to an entity level similarity measure threshold to determine if the similarity measure indicates the query templates $T_1$ and $T_2$ are equivalent for the entity $E_1$.

A high document selection rate for a common search result document with respect to two query templates may be indicative of the common search result document as being relevant to the queries in both the query templates. A high harmonic mean of the term selection rates for a common search result document with respect to two query templates may be indicative of the common search result document as being relevant to each term of the respective query templates. Accordingly, a pair of query templates that may have one or more common search result documents for multiple entities that each may be associated with a high document selection fraction and a high harmonic mean of the term selection fractions, may have a high likelihood of being equivalent query templates.

In some implementations the entity similarity measure between two query templates for a given entity may be based on both the document selection rates and the term selection rates. For example, for a pair of query templates $T_1$ and $T_2$ that each have instantiations based on entity E, and a search result document D that is responsive to one or more such instantiations for both of query templates $T_1$ and $T_2$, the template equivalence determination system 130 may determine, for the document D: a document selection rate for query template $T_1$ of DSR($T_1$, D), a document selection rate for the query template $T_2$ of DSR($T_2$, D), an overall term selection rate for the query template $T_1$ of TSR($T_1$ D), and an overall term selection rate for the query template $T_2$ of TSR($T_2$, D). The entity similarity measure contribution for the search result document D may be determined based on the following equation:

Entity Similarity Measure Contribution for $D$=Min [(DSR($T_1$,$D$)*TSR($T_1$,$D$)),(DSR($T_2$,$D$)*TSR($T_2$, $D$))], where Min [X, Y] denotes the minimum of the values of X and Y. Thus, the entity similarity measure between two query templates for a given entity may be based on the minimum of: the product of the document selection rate and overall term selection rate for a first of the query templates; and the product of the document selection rate and overall term selection rate for a second of the query templates. In some implementations, if one or more of DSR($T_1$, D), DSR($T_2$, D), TSR($T_1$, D), and/or TSR($T_2$, D) fail to satisfy a threshold, they may be set to zero, thereby causing the entity similarity measure to be zero. As discussed herein, various techniques may be utilized for determining the overall term selection rate for a query template, including determining the overall term selection rate based on a harmonic mean of individual term selection rates for the query template. Also, as discussed herein, various techniques may be utilized for determining the document selection rate for the query template.

In some implementations the entity similarity measure between two query templates for a given entity may be determined by aggregating the entity similarity measure contributions for each of the search result documents that are responsive to one or more instantiations for both of the query templates. The entity similarity measure contribution for each of the search result documents may be aggregated utilizing one or more techniques, including a sum, a weighted average, a linear combination, and so forth. In some implementations the entity similarity measure between two query templates may be determined by determining the $I^2$-mean of the similarity measure contribution for each of the search result documents. The $I^2$-mean of K real numbers $Y_1, Y_2, \ldots, Y_K$, may be determined as:

$$\left[\sum_{j=1}^{K} Y_j^2\right]^{1/2} = \sqrt[2]{Y_1^2 + Y_2^2 + Y_3^2 + \ldots + Y_K^2}.$$

For example, the entity similarity measure may be determined as the $I^2$-mean of the similarity measure contributions for each of the search result documents $D_1, D_2, \ldots, D_K$. For example, the entity similarity measure may be determined based on the following equation:

$$\left[\sum_{j=1}^{K} (\text{Entity Similarity Measure Contribution for } D_j)^2\right]^{1/2}.$$

In some implementations, it may be determined whether one or more search result documents is a multi-attribute document. In some implementations, if a document is determined to be a multi-attribute document, document selection rates and/or term selection rates may not be determined for such a document. In some implementations, if a document is determined to be a multi-attribute document, entity similarity measure contributions for that document may not be determined and/or may not be utilized in determining an entity similarity measure. In some implementations, if a document is determined to be a multi-attribute document, entity similarity measure contributions for that document may be weighted less heavily than those associated with documents that lack description of multiple attributes in determining an entity similarity measure.

A multi-attribute document is a document that describes more than a threshold number of attributes of the entity collection of the query templates. In some implementations the threshold is one. In some implementations the threshold may be another relatively low number of attributes such as two, three, or four. Attributes of an entity collection are one or more aspects of the entity collection that may each be utilized to define an aspect of entities of the entity collection. For example, attributes of the entity collection "City" may include, "Area", "Population", and "Unemployment Rate". Also, for example, the entity collection "Country" may include attributes such as "population", "GDP", "area", and so forth. As another example, attributes associated with the entity collection "U.S. Presidents" may include "term in office", "date of birth", "height", "weight", "name of spouse", "location of the Presidential Library", and so forth. For example, the query template [height of <President>] may be instantiated with the entity associated with President "Bill Clinton" and one or more search result documents may be identified that are responsive to the query "height of Bill Clinton". A search result document that is associated with high popularity scores for attributes "height" and "weight" may be determined to be a multi-attribute document and, for example, may not be selected as a search result document that may be relevant to the identification of template equivalence.

In some implementations a database such as content database 120 may store data related to whether a document is a multi-attribute document. For example, an identifier of the document in the content database 120 may include mappings to one or more attributes associated with the document. In some implementations the template equivalence determination system 130 may determine, based on the contents of the document, whether the document is a multi-attribute document. In some implementations the template equivalence determination system 130 may determine the search result document lacks description of multiple attributes of the entity collection if a selection rate threshold for the search result document is only satisfied by queries that contain a single attribute of the entity collection. For example, for attributes associated with an entity collection of "President", a search result document that is only mapped to queries containing a single attribute of that entity collection and having a selection rate for the document that exceeds a threshold, the search result document may be determined to not be a multi-attribute document. On the other hand, for attributes associated with an entity collection of "President", a search result document that is mapped to one or more queries containing the attribute "height" and exceeding the selection rate threshold for the document and one or more queries containing the attribute "weight" and exceeding the selection rate threshold for the document, such search result document may be determined to be a multi-attribute document.

Referring to FIG. 3, an example table is illustrated that will be utilized to describe an example of determining an entity similarity measure between a pair of query templates for an entity. In FIG. 3, the rows are labeled by letters A through E and the columns are labeled by numbers 1 through 5. A position XY will refer to the entry in row X and column Y. Column 1 provides document selection rates (DSR) for the query template $T_x$, for a document $D_x$ that is responsive to one or more instantiations of the query template $T_x$ based on entity $E_1$. For example, the document selection rate illustrated at position B1 in FIG. 3 is 0.4089. In some implementations the query template equivalence system 130 may determine the document selection rates of Column 1 utilizing techniques described herein.

Figure 4:
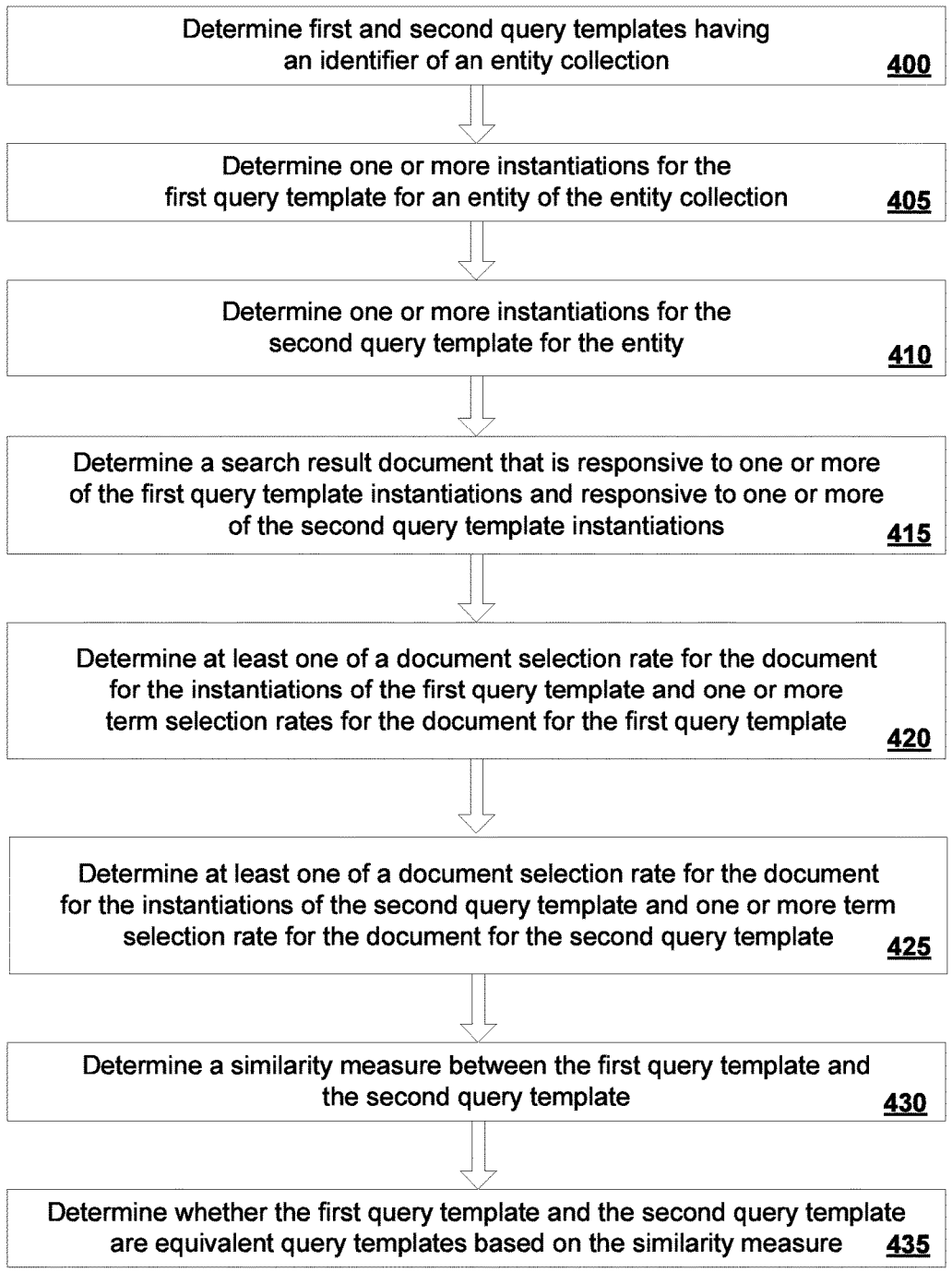
FIG. 4 is a flow chart illustrating an example method of determining whether query templates are equivalent.

Column 2 provides document harmonic means of term selection rates (HMTSR) for the query template $T_x$, for a document $D_x$ that is responsive to one or more instantiations of the query template $T_x$ based on entity $E_1$. For example, the term selection rate illustrated at position B2 in FIG. 4 is 0.5929. In some implementations the query template equivalence system 130 may determine the term selection rates of Column 2 utilizing techniques described herein.

Column 3 provides the product of the document selection rates and the term selection rates of Column 2. For example, 0.2424 illustrated in position C2 in FIG. 4 is the product of the DSR of position B1 (0.4089) and the HMTSR of position B2 (0.5929). In some implementations the query template equivalence system 130 may determine the values of Column 3.

Column 4 provides the entity similarity measure contribution for the document $D_x$. For example, the entity similarity measure for the document $D_1$ is illustrated as 0.2424. In the example of FIG. 3, the entity similarity measure contribution for the document $D_x$ is the minimum value for document $D_x$ in Column 3.

Column 5 provides the entity similarity measure between a pair of query templates for the entity $E_1$. For example, the entity similarity measure is illustrated as 0.3062. In the example of FIG. 3, the entity similarity measure is determined by the $I^2$-mean of the entity similarity measure contribution for the documents $D_1$ and $D_2$. For example, the entity similarity measure may be determined as:

$$ES(E_1)=[0.2424^2+0.1874^2]^{1/2}=[0.0587+0.0351]^{1/2}=0.3062,$$

In some implementations the similarity measure between two query templates may be determined based on the entity similarity measures for multiple entities for which instantiations of the two query templates are determined. For example, a query template $T_1$ may be identified as [attractions in <City>] and a query template $T_2$ may be identified as [places to visit in <City>]. For the entity $E_1$ associated with the city "San Francisco", an entity similarity measure between the two query templates for the entity $E_1$ may be determined as discussed herein. Additional entity similarity measures may be determined for, for example, an entity $E_2$ associated with the city "Los Angeles"; an entity $E_3$ associated with the city "Seattle"; an entity $E_4$ associated with the city "Las Vegas"; and so forth. In some implementations the similarity measure may be based on the number of entity similarity measures that satisfy an entity similarity measure threshold. For example, in some implementations the similarity measure of a query template pair may be based on a ratio of the number of entity similarity measures that satisfy an entity similarity measure threshold to the total number of entities for the entity category of the query template pair. For example, if the number of entity similarity measures that satisfy an entity similarity measure threshold is 50 and the total number of entities for the entity category of the query template pair is 100, the similarity measure may be 0.5 (50/100). In some implementations the similarity measure between two query templates may be determined by aggregating (e.g., determining the $I^2$-mean, a weighted average, a linear combination, and so forth) of the entity similarity measures for each entity.

In some implementations the template equivalence determination system 130 may identify two query templates to be equivalent based on their similarity measure. In some implementations a threshold may be utilized to identify if two query templates may be equivalent. For example, the threshold may be 0.618, and a pair of query templates may be identified as equivalent query templates if their similarity measure is greater than 0.618. For example, the similarity measure between the query templates [attractions in <City>] and [places to visit in <City>] may be determined to be 0.7521. Having satisfied the threshold of 0.618, the query templates [attractions in <City>] and [places to visit in <City>] may be determined to be query templates that are equivalent. Also, for example, the template similarity measure between the query templates [attractions in <City>] and [weather in <City>] may be determined to be 0.0029. Having failed to satisfy the threshold of 0.618, the query templates [attractions in <City>] and [weather in <City>] may be determined to be query templates that are not equivalent.

In some implementations two query templates may be identified as equivalent based on the template equivalence of each of the two query templates to a third query template. For example, the template equivalence determination system 130 may determine that a first query template is equivalent to a second query template, and that the second query template is equivalent to a third query template. Accordingly, based at least in part on such determinations, the template equivalence determination system 130 may determine that the first query template is equivalent to the third query template. In some implementations, such determination may additionally and/or alternatively be based on similarity measures and/or one or more thresholds for similarity measures. In some implementations first and third query templates may be identified as equivalent to each other if four conditions are satisfied: (1) the first query template is equivalent to a second query template; (2) the third query template is equivalent to the second query template; (3) a first similarity measure between the first and second query templates satisfies a threshold; and (4) a second similarity measure between the second and third query templates satisfies a threshold. In some implementations the threshold that needs to be satisfied by the first similarity measure between the first and second query templates and/or the threshold that needs to be satisfied by second similarity measure between the second and third query templates may be an elevated threshold relative to threshold(s) utilized to determine the first and third query templates are equivalent and/or to determine if the second and third query templates are equivalent. The elevated threshold may be utilized to help ensure the first and third query templates are equivalent since limited comparisons or no direct comparisons between such query templates may be performed.

In some implementations the template equivalence determination system 130 may determine two or more queries that are instantiations of equivalent query templates as similar queries based on a determination of equivalence of the respective query templates. For example, having determined that the query templates [attractions in <City>] and [places to visit in <City>] are equivalent query templates, the template equivalence determination system 130 may identify that queries that are instantiations for the two templates are similar queries. For example, based on template equivalence of the query templates [attractions in <City>] and [places to visit in <City>], the queries "attractions in San Francisco", "attractions in sfo", "attractions in sf", "places to visit in San Francisco", "places to visit in sf" and "places to visit in sfo" may be determined to be similar queries. Such similar queries may be provided to the user as suggestions, utilized to determine additional search results for the submitted query, and/or submitted in lieu of the submitted query.

In some implementations an expanded set of query suggestions may be determined based on determined equivalent query templates. For example, for a partial query of "attr sfo" an existing query suggestion may be "attractions sfo". Based on template equivalence of the query templates [attractions in <City>] and [places to visit in <City>], template equivalence determination system 130 may identify "places to visit in sfo" and "attractions sfo" as similar queries and determine a query suggestion of "places to visit in sfo" for the partial query "attr sfo". Additionally, in some implementations, in response to a submitted query, similar queries to the submitted query may be identified based on determined template equivalence between query templates and the similar queries provided to the user.

The content database 120, the template equivalence determination system 130, and/or the search system 140 may be implemented in hardware, firmware, and/or software running on hardware. For example, one or more of the systems may be implemented in one or more computer servers.

Many other configurations are possible having more or fewer components than the environment shown in FIG. 1. For example, in some environments the search system 140 may be omitted.

Referring to FIG. 4, a flow chart illustrates an example method of determining whether query templates are equivalent. Other implementations may perform the steps in a different order, omit certain steps, and/or perform different and/or additional steps than those illustrated in FIG. 4. For convenience, aspects of FIG. 4 will be described with reference to a system of one or more computers that perform the process. The system may include, for example, the template equivalence determination system 130 of FIG. 1.

At step 400, first and second query templates may be determined. The first and second query templates may each include one or more terms, and an identifier of an entity collection. For example, a first query template $T_1$=[attractions in <City>] and a second query template $T_2$=[places to see in <City>] may be determined. Each of the query templates includes an identifier for the entity collection "City".

At step 405, one or more instantiations for the first query template may be determined for an entity of the entity collection. For example, one or more past user queries may be determined that conform to the first query template and include an entity of the entity collection. For example, instantiations for the query template [attractions in <City>] may be determined for the entity associated with the city "San Francisco" based on one or more aliases of the entity. For example, instantiations may include [attractions in sfo], [attractions in san franciso], and so forth.

At step 410, one or more instantiations for the second query template may be determined for the entity of the entity collection. For example, one or more past user queries may be determined that conform to the second query template and include an entity of the entity collection. For example, instantiations for the query template [places to see in <City>] may be determined for the entity associated with the city "San Francisco" based on one or more aliases of the entity. For example, instantiations may include [places to see in sfo], [places to see in san fran], and so forth.

At step 415, a search result document that is responsive to one or more of the first query template instantiations and responsive to one or more of the second query template instantiations is determined. For example, search result document D1 may be responsive to at least the instantiation [attractions in sfo] and may also be responsive to at least the instantiation [places to see sfo].

At step 420, at least one of a document selection rate for the document for the instantiations of the first query template and one or more term selection rates for the document for the first query template are determined. In some implementations both of the document selection rate and the one or more term selection rates are determined. In some implementations the document selection rate may be indicative of the selection rate of the document for all of the instantiations of step 405. In some implementations each term selection rate may be for a respective term of the first query template that is indicative of selections of the document from a set of queries containing only queries that include the term compared to selections of the document from a set of queries also containing queries that do not include the term. In some implementations the set of queries containing only queries that include the term is a subset of the set of queries also containing queries that do not include the term. In some implementations the set of queries are queries that are mapped to the document and that optionally include an alias of the entity of the instantiations. In some implementations an overall term selection rate may be determined based on one or more individual term selection rates.

At step 425, at least one of a document selection rate for the document for the instantiations of the second query template and one or more term selection rates for the document for the second query template are determined. In some implementations both of the document selection rate and the one or more term selection rates are determined. In some implementations the document selection rate may be indicative of the selection rate of the document for all of the instantiations of step 410. In some implementations each term selection rate may be for a respective term of the second query template that is indicative of selections of the document from a set of queries containing only queries that include the term compared to selections of the document from a set of queries also containing queries that do not include the term. In some implementations the set of queries containing only queries that include the term is a subset of the set of queries also containing queries that do not include the term. In some implementations the set of queries are queries that are mapped to the document and that optionally include an alias of the entity of the instantiations. In some implementations an overall term selection rate may be determined based on one or more individual term selection rates.

At step 430, a similarity measure between the first query template and the second query template is determined. The similarity measure may be determined based on the determinations made in step 420 and step 425 utilizing, for example, techniques discussed herein. In some implementations the similarity measure is based on an entity similarity measure determined for the entity of the instantiations of steps 405 and 410. The entity similarity measure may be determined based on the determinations made in step 420 and step 425 utilizing, for example, techniques discussed herein. In some implementations steps 405-425 may be iterated multiple times, with each iteration being for a different entity of the entity collection. An entity similarity measure for each entity of the iterations may be determined based on the determinations made in step 420 and step 425 for that entity. In some implementations the similarity measure between the first query template and the second query template of step 430 may be based on the entity similarity measures for multiple of the entities.

At step 435, it is determined whether the first query template and the second query template are equivalent query templates based on the similarity measure. For example, if the similarity measure satisfies a similarity measure threshold the first query template and the second query template may be determined to be equivalent query templates.

Figure 5:
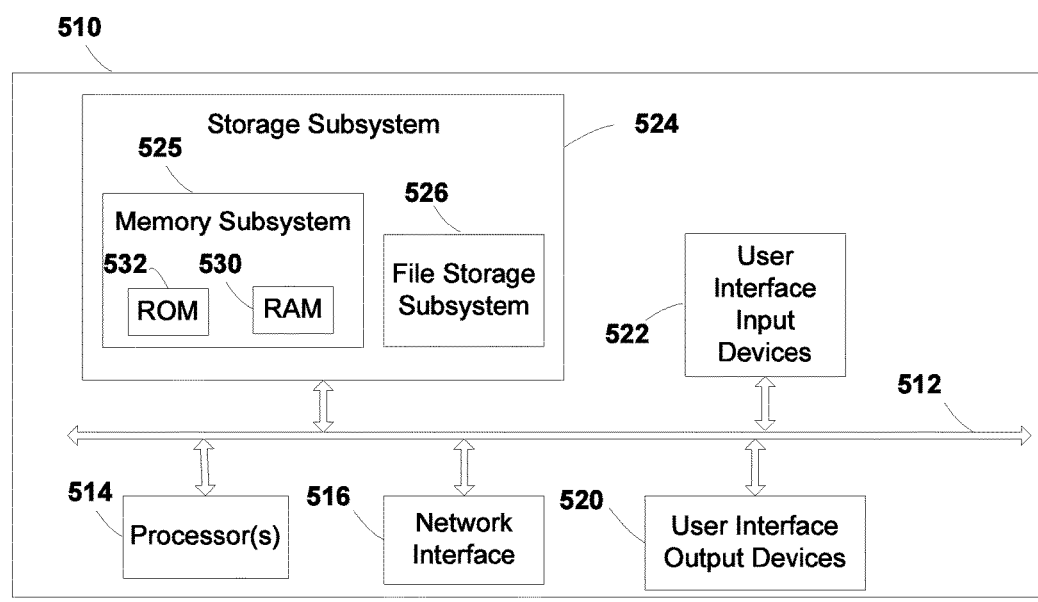
FIG. 5 illustrates a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface input devices 522, user interface output devices 520, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to determine document selection rates, term selection rates, entity similarity measures, and/or template similarity measures. As another example, the storage subsystem 524 may include the logic to determine whether query templates are equivalent query templates based on a similarity measure.

These software modules are generally executed by processor 514 alone or in combination with other processors. Memory 525 used in the storage subsystem can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several inventive implementations have been described and illustrated herein, a variety of other means and/or structures for performing the function and/or obtaining the results and/or one or more of the advantages described herein may be utilized, and each of such variations and/or modifications is deemed to be within the scope of the inventive implementations described herein. More generally, all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

As used herein in the specification and in the claims, the term "database" will be used broadly to refer to any collection of data. The data of the database does not need to be structured in any particular way, or structured at all, and it can be stored on storage devices in one or more geographic locations.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer-implemented method, comprising:
   determining a first query template, the first query template including one or more first template terms and an identifier of an entity collection, the entity collection being a grouping of entities that share one or more aspects in common;
   determining a second query template, the second query template including one or more second template terms and the identifier of the entity collection, the second template terms including at least one term that is unique from the first template terms;
   identifying a given entity of the entity collection;
   determining first query template instantiations for the given entity, each first query template instantiation including the first template terms and one of one or more aliases of the entity;
   determining second query template instantiations, each second query template instantiation including the second template terms and one of the one or more aliases of the entity;
   determining a search result document that is responsive to one or more of the first query template instantiations and responsive to one or more of the second query template instantiations;
   determining a first document selection rate of the search result document for the first query template instantiations;
   determining a second document selection rate of the search result document for the second query template instantiations;
   identifying, from a record of past queries, first past instantiations of the first query template and second past instantiations of the second query template;
   determining a quantity of entities of the entity collection that are included in both: a corresponding one of the first past instantiations of the first query template in the record of past user queries, and a corresponding one of the second past instantiations of the second query template in the record of past user queries;
determining a similarity measure between the first query template and the second query template, wherein determining the similarity measure is based on:
the first document selection rate and the second document selection rate, and
comparison of the determined quantity of the entities to a threshold;
determining that the first and second query templates are equivalent query templates based on the similarity measure;
subsequent to determining that the first and second query templates are equivalent query templates:
receiving a query formulated by a user via a client device of the user, the query conforming to the first query template; and
providing, in response to the query, content that is based on an instantiation of the second query template,
wherein the content is provided for presentation to the user via the client device, and
wherein the content is based on the instantiation of the second query template based on the query conforming to the first query template and based on determining that the first and second query templates are equivalent query templates.

2. The method of claim 1, further comprising determining, for the given entity:
one or more first term selection rates for the search result document, each first term selection rate being for one first template term of one or more of the first template terms for the search result document; and
one or more second term selection rates for the search result document, each second term selection rate being for one second template term of one or more of the second template terms for the search result document;
wherein determining the similarity measure between the first query template and the second query template is further based on the first query template term selection rate and the second query template term selection rate.

3. The method of claim 2, wherein each first term selection rate is based on a selection rate of the search result document among a first query set that includes only queries that include the given entity and the first template term; and wherein each second term selection rate is based on a selection rate of the search result document among a second query set that includes only queries that include the given entity and the second template term.

4. The method of claim 2, further comprising:
determining a first harmonic mean of the first query template term selection rates; and
determining a second harmonic mean of the second query template term selection rates;
wherein determining the similarity measure between the first query template and the second query template is based on the first harmonic mean and the second harmonic mean.

5. The method of claim 4, wherein determining the similarity measure between the first query template and the second query template is based on multiplying the first selection rate by the first harmonic mean and multiplying the second selection rate by the second harmonic mean, and determining a minimum value of the multiplications.

6. The method of claim 1, further comprising determining the first selection rate and the second selection rate satisfy a selection rate threshold.

7. The method of claim 1, further comprising determining the search result document lacks description of multiple attributes of the entity collection and only utilizing the search result document if it lacks description of multiple attributes.

8. The method of claim 7, wherein determining the search result document lacks description of multiple attributes of the entity collection includes determining a selection rate threshold for the search result document is only satisfied by queries that contain a single attribute of the entity collection.

9. The method of claim 1, wherein the first query template instantiations and the second query template instantiations are determined from the record of past queries.

10. The method of claim 9, wherein the record of past queries includes only those queries submitted with at least a threshold level of frequency.

11. The method of claim 1, further comprising:
determining additional entities of the entity collection;
determining, for each additional entity of the additional entities:
additional first instantiations for the additional entity based on the first query template;
additional second instantiations for the additional entity based on the second query template;
an additional search result document that is responsive to one or more of the additional first query template instantiations and responsive to one or more of the additional second query template instantiations;
an additional first document selection rate of the search result document for the additional first query template instantiations;
an additional second document selection rate of the search result document for the additional second query template instantiations; and
determining an additional entity similarity measure based on the additional first document selection rate and the additional second document selection rate.

12. The method of claim 1, further comprising determining the first template terms and the second template terms are synonymous based on determining the first and second query templates are equivalent query templates.

13. A computer-implemented method, comprising:
determining a first query template, the first query template including one or more first template terms and an identifier of an entity collection, the entity collection being a grouping of entities that share one or more aspects in common;
determining a second query template, the second query template including one or more second template terms and the identifier of the entity collection, the second template terms including at least one term that is unique from the first template terms;
identifying entities of the entity collection;
determining a quantity of entity groups of instantiations of the first query template and the second query template in a record of past queries, each entity group including first query template instantiations of past queries for a corresponding given entity of the entities and second query template instantiations of the past queries for the corresponding given entity, each first query template instantiation of the entity group including the first template terms and one of multiple aliases of the corresponding given entity and each second query template of the entity group including the second template terms and one of multiple aliases of the corresponding given entity;

determining that the quantity of the entity groups satisfies a threshold;

determining that the first and second query templates are equivalent query templates based on the quantity of the entity groups satisfying the threshold;

subsequent to determining that the first and second query templates are equivalent query templates:

receiving a query formulated by a user via a client device of the user, the query conforming to the first query template; and providing, in response to the query, content that is based on an instantiation of the second query template, wherein the content is provided for presentation to the user via the client device, and wherein the content is based on the instantiation of the second query template based on the query conforming to the first query template and based on determining that the first and second query templates are equivalent query templates.

14. A system including memory and one or more processors operable to execute instructions stored in the memory, wherein the instructions include instructions to:

determine a first query template, the first query template including one or more first template terms and an identifier of an entity collection, the entity collection being a grouping of entities that share one or more aspects in common;

determine a second query template, the second query template including one or more second template terms and the identifier of the entity collection, the second template terms including at least one term that is unique from the first template terms;

identify a given entity of the entity collection;

determine first query template instantiations for the given entity, each first query template instantiation including the first template terms and one of one or more aliases of the entity;

determine second query template instantiations, each second query template instantiation including the second template terms and one of the one or more aliases of the entity;

determine a search result document that is responsive to one or more of the first query template instantiations and responsive to one or more of the second query template instantiations;

determine a first document selection rate of the search result document for the first query template instantiations;

determine a second document selection rate of the search result document for the second query template instantiations;

identify, from a record of past queries, first past instantiations of the first query template and second past instantiations of the second query template;

determine a quantity of entities of the entity collection that are included in both: a corresponding one of the first past instantiations of the first query template in the record of past user queries, and a corresponding one of the second past instantiations of the second query template in the record of past user queries;

determine a similarity measure between the first query template and the second query template, wherein the instructions to determine the similarity measure include instructions to determine the similarity measure based on:

the first document selection rate and the second document selection rate, and comparison of the determined quantity of the entities to a threshold;

determine that the first and second query templates are equivalent query templates based on the similarity measure;

subsequent to determining that the first and second query templates are equivalent query templates:

receive a query formulated by a user via a client device of the user, the query conforming to the first query template;

provide, in response to the query, content that is based on an instantiation of the second query template, wherein the content is provided for presentation to the user via the client device, and wherein the content is based on the instantiation of the second query template based on the query conforming to the first query template and based on determining that the first and second query templates are equivalent query templates.

15. The system of claim 14, wherein the instructions comprise further instructions to:

determine additional entities of the entity collection;

determine, for each additional entity of the additional entities:

additional first instantiations for the additional entity based on the first query template;

additional second instantiations for the additional entity based on the second query template;

an additional search result document that is responsive to one or more of the additional first query template instantiations and responsive to one or more of the additional second query template instantiations;

an additional first document selection rate of the search result document for the additional first query template instantiations;

an additional second document selection rate of the search result document for the additional second query template instantiations; and determine the similarity measure based on the additional first document selection rate and the additional second document selection rate.

* * * * *